(12) United States Patent
Black et al.

(10) Patent No.: US 6,546,386 B1
(45) Date of Patent: Apr. 8, 2003

(54) BRILLIANT QUERY SYSTEM

(75) Inventors: Peter M. Black, Pacific Palisades, CA (US); Anthony Bryan Waters, Rowlett, TX (US)

(73) Assignee: etronica.com, Los Angeles, CA (US)

( * ) Notice: Subject to any disclaimer, the term of this patent is extended or adjusted under 35 U.S.C. 154(b) by 291 days.

(21) Appl. No.: 09/703,006

(22) Filed: Oct. 31, 2000

Related U.S. Application Data

(63) Continuation-in-part of application No. 09/630,227, filed on Aug. 1, 2000.

(51) Int. Cl.$^7$ .............................................. G06F 17/30
(52) U.S. Cl. ........................................................ 707/4
(58) Field of Search ................................ 707/1, 2, 3, 4, 707/5, 7, 8, 10, 514; 704/7, 9, 243

(56) References Cited

U.S. PATENT DOCUMENTS

| | | | | |
|---|---|---|---|---|
| 5,598,557 A | * | 1/1997 | Doner et al. ................... | 707/5 |
| 6,286,000 B1 | * | 9/2001 | Apte et al. ...................... | 707/5 |
| 6,366,908 B1 | * | 4/2002 | Chong et al. .................. | 707/3 |

OTHER PUBLICATIONS

G. Pascal Zachery, "The Godfather," Wired, Wired (unknown), ( Nov. 30, 1997).
Steve Ditlea, "Ted Nelson's Big Step," techreview.com, techreview.com (unknown), (Oct. 31, 1998).
Webopedia, "hypertext," Webopedia, Webopedia (unknown), (Sep. 1, 1996).
Webopedia, "hypermedia," Webopedia, Webopedia (unknown), (Oct. 5, 1997).
Webopedia, "hyperlink," Webopedia, Webopedia (unknown), (Feb. 25, 1997).
Webopedia, "hot link," Webopedia, Webopedia (unknown), (Sep. 1, 1996).
W.N. Francis & H. Kucera, "Frequency Analysis of English Usage," Boston:Houghton–Mifflin, (1982).
L. Hillman, "Sum: Am. English Word Frequency Lists," Linguist List 7.583, (1996).

* cited by examiner

*Primary Examiner*—Diane D. Mizrahi
*Assistant Examiner*—Apu M Mofiz
(74) *Attorney, Agent, or Firm*—Sanford Astor

(57) ABSTRACT

A system for conducting queries from any document displayed on any computer device, comprising the creation of more focused "brilliant queries" by conducting a statistical frequency analysis of the word occurrence in the document to determine both the primary subject matter (the hook) of the corpus and the keywords in the corpus, using editorial judgment or filtering of the keyword list to determine the most important keywords, application and tuning of the keyword set to target particular databases and adding the suggested hook/keyword combinations to the document for use by the computer user in selecting queries.

27 Claims, 5 Drawing Sheets

Lazio accuses Clinton of flip-flopping on Jerusalem

(New York-AP, July 29, 2000) _ Hillary Rodham Clinton spent some time today blaming Palestinian leader Yasser Arafat for the breakdown in the recent Middle East peace talks.

Meanwhile her Senate opponent, Rick Lazio, accused her of flip-flopping on moving the U-S Embassy in Israel to Jerusalem.

Lazio, courting the Jewish vote in the Hamptons, noted that the first lady's call to relocate the embassy from Tel Aviv comes just nine months after she told an Orthodox Jewish group that she could not support an immediate move of the facility.

For the first time in her Senate bid, Clinton today set a year-end deadline for the American Embassy to move to Jerusalem. In December, in a meeting with the Union of Orthodox Jewish Congregations *of* America, she declined to make such a commitment.

As Clinton seeks New York's critical Jewish vote, which represents about 12 percent of the state's electorate, she appears to be taking a page out of her husband's political book.

She spoke the same day as President Clinton, in a front page story in The New York Times, said the United States would consider moving its embassy from Tel Aviv to Jerusalem.

His wife took a stronger position Saturday, declaring a timetable for such a decision.

(Copyright 2000 by The Associated Press. All Rights Reserved.) ■

Fig. 1

```
<propernames>
    <propername>
        <nametext>Orthodox Jewish</nametext>
        <namefreq>6</namefreq>
    </propername>
    <propername>
        <nametext>American Embassy</nametext>
        <namefreq>6</namefreq>
    </propername>
    <propername>
        <nametext>Orthodox Jewish Congregations</nametext>
        <namefreq>6</namefreq>
    </propername>
    <propername>
        <nametext>U-S Embassy</nametext>
        <namefreq>4</namefreq>
    </propername>
    <propername>
        <nametext>Jewish</nametext>
        <namefreq>4</namefreq>
    </propername>
    <propername>
        <nametext>Clinton</nametext>
        <namefreq>3</namefreq>
    </propername>
    <propername>
        <nametext>Senate</nametext>
        <namefreq>2</namefreq>
    </propername>
    <propername>
        <nametext>New York</nametext>
        <namefreq>2</namefreq>
```

Fig 2

```
EE XML News Processor v1.4

Loading keywords: keywords.txt
Loading stopwords: stopwords.txt
Processing lazio.xml at 10/30/2000 19:42:20
Dumping Word Frequencies for "Lazio"

Embassy                                              =4
Jewish                                               =4
Clinton                                              =3
Jerusalem                                            =3
move                                                 =2
York                                                 =2
first                                                =2
Senate                                               =2
Aviv                                                 =2
Orthodox                                             =2
page                                                 =2
vote                                                 =2
moving                                               =2
Lazio                                                =2
year                                                 =1
opponent                                             =1
declaring                                            =1
facility                                             =1
Rick                                                 =1
stronger                                             =1
timetable                                            =1
nine                                                 =1
make                                                 =1
critical                                             =1
```

Fig 3

```
# Etronica Keyword System Copyright 1989-2000 (patent pending)
# Revision September 20, 2000
aboriginal
abstract
abstract expressionist
absurdist
accident:accidents,accidental
accommodation
accord
accounting:accountant,bookkeeping
acquisition
advance
adversary
advertising
affliction
Africa:African
African-American
African-American:negro
agency
agenda
aggression
agriculture:farm,farmer,farming
algebra
alliance
amateur
America:American,US,United States
amnesty
anarchist:anarchism,anarchy
ancient
animation:cartoon,computer graphics,CGI
animist:animism
anthropology
```

Fig 4

Lazio accuses Clinton of flip-flopping on Jerusalem (New York-AP, July 29, 2000) _ Hillary Rodham Clinton spent some time today blaming Palestinian leader Yasser Arafat for the breakdown in the recent Middle East peace talks.

Meanwhile her Senate opponent, Rick Lazio, accused her of flip-flopping on moving the U-S Embassy in Israel to Jerusalem.

Lazio, courting the Jewish vote in the Hamptons, noted that the first lady's call to relocate the embassy from Tel Aviv comes just nine months after she told an Orthodox Jewish group that she could not support an immediate move of the facility.

For the first time in her Senate bid, Clinton today set a year-end deadline for the American Embassy to move to Jerusalem. In December, in a meeting with the Union of Orthodox Jewish Congregations of America, she declined to make such a commitment.

As Clinton seeks New York's critical Jewish vote, which represents about 12 percent of the state's electorate, she appears to be taking a page out of her husband's political book.

She spoke the same day as President Clinton, in a front page story in The New York Times, said the United States would consider moving its embassy from Tel Aviv to Jerusalem.

His wife took a stronger position Saturday, declaring a timetable for such a decision.

(Copyright 2000 by The Associated Press. All Rights Reserved.) ■

- Search for more information on Hillary Clinton and time
- Search for more information on Hillary Clinton and Palestine
- Search for more information on Hillary Clinton and peace
- Search for more information on Hillary Clinton and embassy
- Search for more information on Hillary Clinton and Israel
- Search for more information on Hillary Clinton and Jewish
- Search for more information on Hillary Clinton and America
- Search for more information on Hillary Clinton and union

- Search for more information on Hillary Clinton and politics
- Search for more information on Hillary Clinton and book
- Search for more information on Hillary Clinton and president

Fig. 5

BRILLIANT QUERY SYSTEM

This application is a continuation-in-part of our application Ser. No. 09/630,227 filed Aug. 1, 2000.

FIELD OF THE INVENTION

The invention relates to providing an improved system for conducting queries over the Internet, (the Net), and private Intranets.

BACKGROUND OF THE INVENTION

The Internet delivers trillions of words to billions of screens. The Net contains an enormous amount of material. Often when conducting searches on the Net one receives far too many search results, most of which are not relevant. One of the simplest ways to obtain more focused searches is to use a Boolean ANDed search with search engines such as, Yahoo, Excite, Google and Alta Vista. Instead of using one word, two words are used and much irrelevant material is discarded.

For example, searching on the word blackbird might yield tens of thousands of hits, with results ranging from rock bands, to birds, to consulting firms, to airplanes. Search on blackbird AND reconnaissance and the number of hits can be reduced by two orders of magnitude (from 6,000 to 60 hits) and almost all of the referenced Web sites (the "hits") deal with the famous SR-71 spy plane (known as the "Blackbird"). The effect of the ANDed search is that both the words Blackbird and reconnaissance MUST occur in the verbiage of the Web page, and that the word blackbird is more important than reconnaissance because it comes first in the search, hence pages with more occurrances of the word blackbird will be sorted first in the resulting list by most search engines. Each of the search engines prioritizes the hits they return, on the basis of their own set of rules for importance, credibility or popularity. What these search engines do not do is to figure out just what you are really interested in.

OBJECTS OF THE INVENTION

It is an object of this invention to enhance a body of text to add focused and selected queries to the text.

It is a further object of the invention to provide a system to automatically add highly relevant and focused queries to a text, such as magazine articles, news stories or any other text.

SUMMARY OF THE INVENTION

Brilliant queries require a preparation process that analyzes any text to enhance and generate a set of suggested searches based on that analysis and certain pre-set user parameters. The output of this preparation process can be used to add links to an HTML page of a document either automatically or through manual insertion of the resulting analysis.

Brilliant query links have two components: a "hook" and a "keyword". The hook is an overall concept or phrase that describes the subject matter of the text body. The keyword is a word that is derived from the analysis of the text and indicates a secondary or related concept. Brilliant queries are a collection of one or more pairings of the hook and a keyword. For example, an article on the SR-71 Blackbird Airplane might have the following brilliant queries:

1. Search for more information on BLACKBIRD and AVIATION
2. Search for more information on BLACKBIRD and ELINT
3. Search for more information on BLACKBIRD and RECONNAISSANCE
4. Search for more information on BLACKBIRD and TRANSPORT The hook is BLACKBIRD and the keywords are AVIATION, ELINT (electronic intelligence) RECONNAISSANCE and TRANSPORT.

The hook is the concept, primary subject matter or main topic for a body of text. The hook is used to define a query as narrowly as possible on a particular topic for a selected information source. To determine a "hook", a content layer must exist for which a context can be determined. There must be a perceivable structure to the information source and each content entry must have an associated context or place or places within the structure of the information source.

Information source is defined as any collection of content that is searchable for the purpose of locating specific content selections. Included in this are encyclopedias, news archives, dictionaries and other specific content collections. This includes search engines on the Internet that effectively turn the entire Internet into a single searchable information source.

Keywords are simply a collection of words, generated automatically or manually, that are deemed to be indicative of the topic matter or one of the topics for a given content selection. Keywords are determined by comparison of a predetermined list of keywords to the text of the content selection. If the content selection contains one or more of the keywords, then that keyword is associated with that text body and potentially used for the brilliant query. Keywords may also be determined by statistical frequency analysis of the text, with or without manual selection and addition of synonyms.

Stopwords are a collection of words that are used so frequently in a language that they provide no benefit at all as a search target for the selection of relevant content. This includes articles, conjunctions, prepositions, pronouns, etc.

Selection of Keywords

A brilliant query requires a list of keywords that are generated by automatic or manual statistical and empirical analysis of the body of content to be enhanced or a comparable body of content. The keyword list for a given content source is generated through the use of frequency analysis, stopword removal and finally, manual selection using empirical testing of the results generated by a given potential keyword. Based on experience, a solid keyword list usually runs between 250 and 1000 words and phrases which are chosen by the system designer.

Also, keywords can be manually tuned through the use of a thesaurus feature whereby a given keyword can be associated with one or more synonyms that would indicate the use of the keyword whenever one or more of the synonyms appear in the body of text to be enhanced.

Automatic Generation of the Hook

One embodiment of the brilliant query to enable an automatic process for generating brilliant queries for a body of text, is to determine the hook by extracting the highest frequency proper names from the text body. This process requires a two-pass analysis of the body of text. The first pass simply generates a frequency table with an entry for each word with the exclusion of stop words.

The second pass relies on the identification of proper names and punctuation to select a hook. Proper names are identified by locating all adjacent capitalized words not separated by punctuation. Frequencies for each proper name sequence are calculated by averaging the individual word frequencies by the number of words in the sequence. The hook is then selected by using the most frequently mentioned proper name sequence with the highest frequency. Also, if a word appears in multiple sequences, the longer sequence is given preference, even if it is a lower frequency than the shorter sequence.

For Example

"Governor Bush had a strong, substantive week," Communications Director Karen Hughes said of a six-day, nine state swing in which Bush recovered from the verbal gaffes and tactical blunders that plagued his campaign in late August and early September.

"Governor Bush"—frequency (1.5);

"Communications Director Karen Hughes"—frequency (1.0);

"Bush"—frequency (2.0);

"August"—stopworded;

"September"—stopworded.

The analysis of the previous text results in "Governor Bush" being selected as the hook since "Bush" appears as a single word and as part of a phrase, the longer phrase is used even though it has a lower frequency than "Governor Bush".

Common proper names such as days of the week and months are included in the stopword list. The automatic hook generation technique described here works very well for encyclopedic and news related content sources.

Automatic Generation of the Keywords

A word frequency analysis is done on all of the text, with stopwords excluded, and the resulting words, by order of frequency are compared to a pre-selected keyword list. Those that match, based upon a desired frequency become keywords to be combined with the hook to form focused, optimal queries.

Generation of Brilliant Queries

Once the keywords have been selected and the hook for a body of text has been determined or automatically generated, the searches are created by generating a link for every keyword extracted from the body of text and combining it with the hook in a search that results in a result set that is the logical intersection of the results generated by the hook and the keyword. Basically, each entry in the list of search results must contain both the hook and the keyword and not just one or the other.

This requires the use of special syntax for most search engines similar to the following:

Search Query:+"Governor Bush"+campaign

The + is commonly used to indicated a required word or phrase in a query for a search engine and the quotes indicate that the phrase "Governor Bush" is to be treated as a phrase and not as individual words. So the query above instructs a search engine to locate all articles containing the phrase "Governor Bush" and the word "campaign".

After the hook and the keywords have been established the query is conducted selecting one of the hook-keyword sets. The selected set is then automatically converted to the appropriate syntax for a selected target search engine, to provide the best and most suitable query to obtain the most relevant query results, which must contain both the hook and the keyword or phrase.

BRIEF DESCRIPTION OF THE DRAWINGS

FIG. 1 is a depiction of a computer screen showing a body of text;

FIG. 2 is a depiction of a computer screen showing the statistical frequency analysis of the hook;

FIG. 3 is a depiction of a computer screen showing the statistical frequency analysis of keywords;

FIG. 4 is a partial pre-selected keyword list;

FIG. 5 is a depiction of a computer screen showing selected focused queries.

DESCRIPTION OF THE PREFERRED EMBODIMENTS

The creation of brilliant queries consists of four steps:

1. Selection of a corpus, that is, a body of text such a news report;

2. Statistical frequency analysis of the word occurrence in the corpus;

3. Editorial judgment or filtering of the keyword list;

4. Application and tuning of the keyword set to target databases.

FIG. 1 is a body of text comprising a WABC Eyewitness News Online article entitled, "Lazio accuses Clinton of flip-flopping on Jerusalem". Automatic statistical frequency analysis of the capitalized words in the article are shown in FIG. 2. Editorial judgment resulted in "Hillary Clinton" as the hook, the primary subject matter of the article, as the only person's proper name in the list. Automatic statistical frequency analysis of the article for keywords resulted in a number of keywords shown in FIG. 3. These included time, Palestine, peace, embassy, Israel, Jewish, America, union, politics, book and president. Those keywords can be matched to a pre-selected list of universal keywords, a partial list of which are shown in FIG. 4. Each of these combinations, hook (Hillary Clinton) and keyword (FIG. 3), appear on the screen (FIG. 5) as suggested focused queries available to the viewer to conduct a further search for the focused information in which he or she is interested. Any of the suggested queries may be selected and sent to a pre-selected search engine or information source, or may be sent to a search engine or information source selected by the user. When the search engine or information source is selected by the user, the system will place the query in the proper syntax for that particular search engine or information source. By using these focused searches, the user can retrieve only that information in which he or she is really interested instead of wide scattered, irrelevant results.

Word frequency studies of text is a well known process for the study of language. For instance, see a book entitled "Frequency Analysis of English Usage" by W. N. Francis and H. Kucera (1982) Boston: Houghton-Mifflin. See also, "Sum: Am. English Word Frequency Lists", by L. Hillman. Applicants have used frequency analysis to obtain much more focused search results on the Net and other search sources.

This system is applicable to any body of text. Text that has a specialized subject matter, such as a medical text or a legal text, will be analyzed to create keywords that are associated with that subject matter. This system can be applied to any subject matter of any text.

Having thus described the invention, we claim:

1. A system for submitting to an information source, a query based upon any document displayed on any computer device comprising, conducting a statistical frequency analysis of the word occurrence in the document to determine the subject matter of the document, the subject matter being the most frequently occurring proper name or non-stopword, and the keywords in the document, the keywords being determined by the frequency analysis or by comparison to a pre-selected keyword list and creating queries by combining the subject matter with each of the keywords.

2. The system of claim 1 in which only the most relevant keywords are utilized to create queries.

3. The system of claim 2 in which the most relevant keywords are selected by comparing the keywords found by frequency analysis to a pre-selected keyword list.

4. The system of claim 2 in which synonyms are associated with some or all keywords.

5. The system of claim 2 in which the subject matter is determined by a statistical frequency analysis of the proper names in the document.

6. The system of claim 5 in which the proper names are identified by locating all adjacent capitalized words not separated by punctuation.

7. The system of claim 6 in which frequencies for each proper name sequence are calculated by averaging the individual word frequencies by the number of words in the sequence and the subject matter is selected by using the most frequently mentioned proper name sequence with the highest frequency.

8. The system of claim 7 in which, where a proper name appears in multiple sequences, the longer sequence is selected, even if it is lower frequency than the shorter sequence.

9. The system of claims 2, 3, 4, or 5 in which the context is automatically added to the query, without selection by the user.

10. The system of claims 1, 2, 3, 4, 5, 6, 7 or 8 in which functionally useless words are masked out of the statistical frequency analysis.

11. The system of claims 1, 2, 3, 4, 5, 6, 7 or 8 in which the selected query is automatically placed in the proper syntax for the information source selected for the query.

12. The system of claims 1, 2, 3, 4, 5, 6, 7 or 8 in which a list of subject matter/keyword queries is placed on the screen of the computer device, adjacent the document.

13. The system of claims 1, 2, 3, 4, 5, 6, 7 or 8 in which the subject matter and keywords are embedded in hidden HTML.

14. The system of claims 1, 2, 3, 4, 5, 6, 7 or 8 in which the subject matter and keywords are added using XML.

15. A system for creating focused queries for submission to an information source, based upon any document displayed on any computer device comprising, conducting a statistical frequency analysis of the word occurrence in the document to determine the subject matter of the document, the subject matter being the most frequently occurring proper name or non-stopword, and the keywords in the document, choosing the keywords by matching the keywords found in the frequency analysis with a pre-selected keyword list, masking out functionally useless words, and creating queries by a combination of the subject matter with each of the keywords.

16. The system of claim 15 in which only the most relevant keywords are utilized to create queries.

17. The system of claim 15 in which synonyms are associated with some or all keywords.

18. The system of claim 15 in which the subject matter is determined by a statistical frequency analysis of the proper names in the document.

19. The system of claim 17 in which the proper names are identified by locating all adjacent capitalized words not separated by punctuation.

20. The system of claim 19 in which frequencies for each proper name sequence are calculated by averaging the individual word frequencies by the number of words in the sequence and the subject matter is selected by using the most frequently mentioned proper name sequence with the highest frequency.

21. The system of claim 20 in which, where a proper name appears in multiple sequences, the longer sequence is selected, even if it is lower frequency than the shorter sequence.

22. The system of claims 15, 16, 17, 18, 19, 20, or 21 in which the selected query is automatically placed in the proper syntax for the information source selected for the query.

23. The system of claims 15, 16, 17, 18, 19, 20, or 21 in which a list of subject matter/keyword queries is placed on the screen of the computer device, adjacent the document.

24. The system of claims 15, 16, 17, 18, 19, 20, or 21 in which the subject matter and keywords are embedded in hidden HTML.

25. The system of claims 15, 16, 17, 18, 19, 20, or 21 in which the subject matter and keywords are added using XML.

26. The process of claims 1 or 15 in which the information source is preset.

27. The process of claims 1 or 15 in which the information source is selected by the user prior to submitting the query.

* * * * *